No. 671,717.  
G. A. BLAKE.  
SELF CLOSING VALVE.  
(Application filed July 16, 1900.)  
Patented Apr. 9, 1901.
(No Model.)  
2 Sheets—Sheet 2.
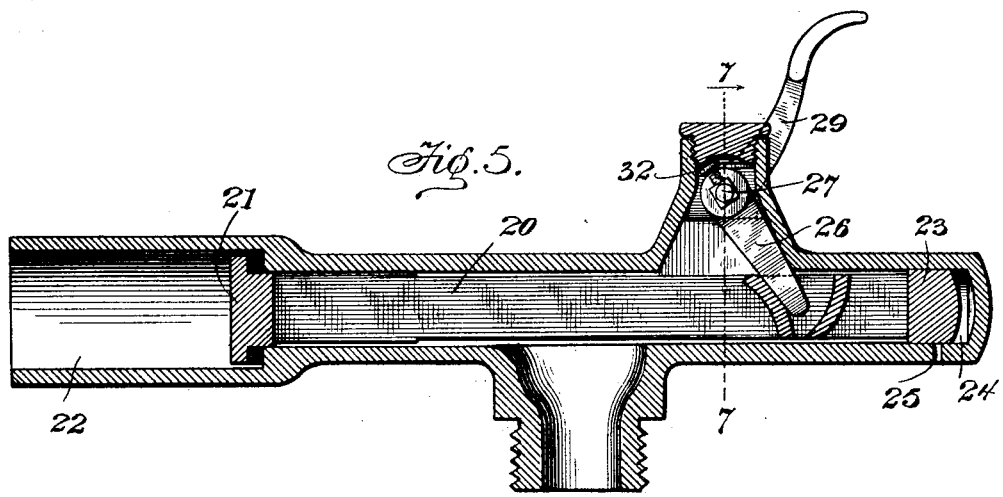
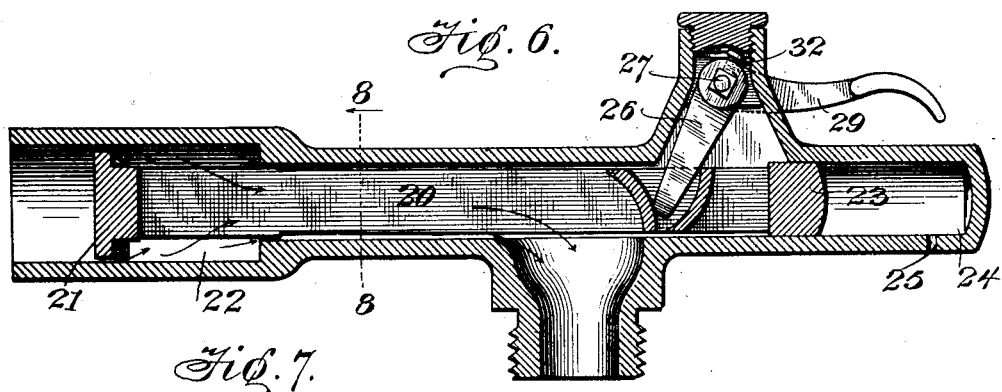
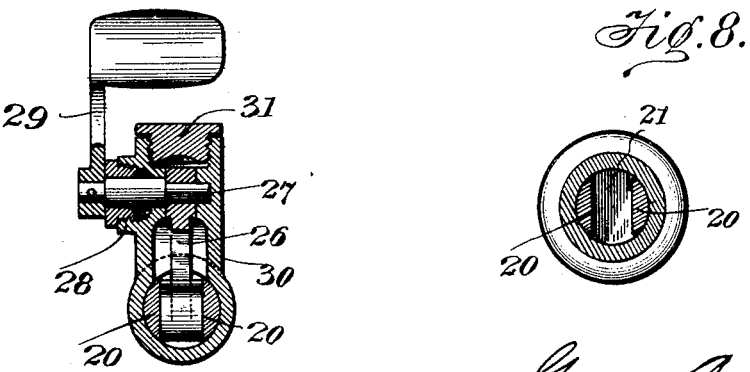
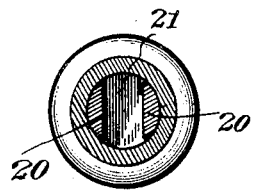
Witnesses  
Fenton S. Belt.  
Arthur L. Bryant
Inventor  
George A. Blake  
By Watson & Watson  
Attorneys

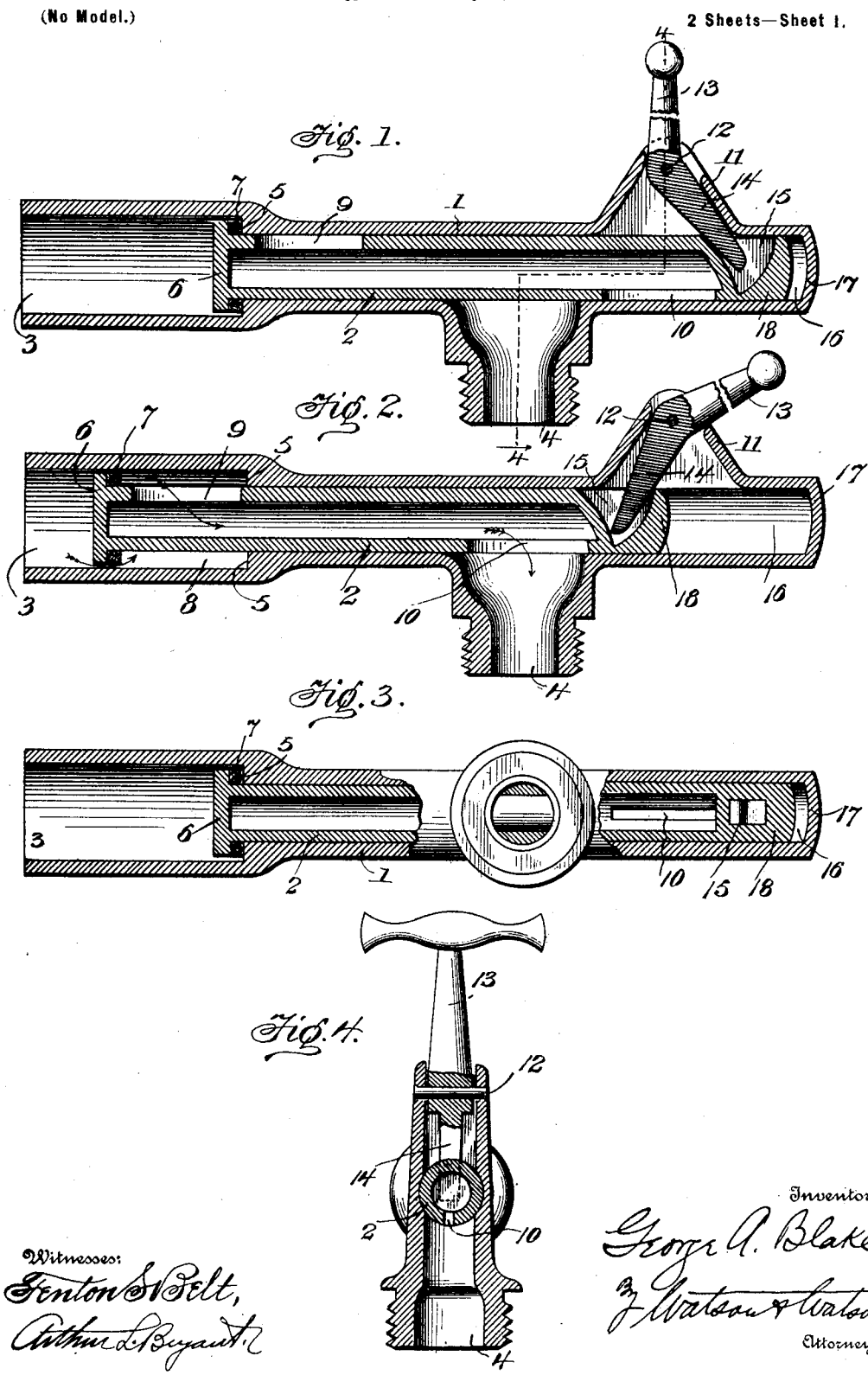

UNITED STATES PATENT OFFICE.

GEORGE A. BLAKE, OF NEW BEDFORD, MASSACHUSETTS.

SELF-CLOSING VALVE.

SPECIFICATION forming part of Letters Patent No. 671,717, dated April 9, 1901.

Application filed July 16, 1900. Serial No. 23,778. (No model.)

*To all whom it may concern:*

Be it known that I, GEORGE A. BLAKE, a citizen of the United States, residing at New Bedford, in the county of Bristol and State of Massachusetts, have invented certain new and useful Improvements in Self-Closing Valves, of which the following is a specification.

The present invention comprises a self-closing valve in which the valve proper is closed by the pressure of water or other fluid back of it and "water-hammer" is prevented by means of an air-cushion.

My valve has the advantage of closing at three different points, all of which must be passed by the water. It is therefore very secure against leakage. It is also simple and cheap in construction.

The invention is illustrated in the accompanying drawings, in which—

Figure 1 is a central section in the plane of the operating-lever, showing the valve closed. Fig. 2 is a similar section showing the valve open. Fig. 3 is a plan view, partly in section, the valve being closed. Fig. 4 is a section on the line 4 of Fig. 1. Figs. 5 and 6 are views of a modification corresponding to Figs. 1 and 2, and Figs. 7 and 8 are sections on the lines 7 and 8 of Figs. 5 and 6.

Referring to Figs. 1 to 4, inclusive, of the drawings, 1 indicates the valve-casing, and 2 the valve. The valve is cylindrical in general form, and it slides within a cylindrical opening in the casing. The outer surface of the casing may be of any desired form or contour. It is provided with an inlet-opening 3 at one end and an outlet-opening 4 at one side. The valve-casing has an annular seat 5 near the inlet end which coöperates with a head 6 on the valve to shut off the fluid, the head 6 having a projecting flange which rests upon the seat when the valve is closed. If desired, a suitable washer 7 may be employed. The head 6 is reciprocated in an enlarged cylindrical chamber 8 at the inlet end of the casing, which chamber is of larger diameter than the head, so that water or other fluid may pass around the same when the valve is open, as indicated by the arrow. The fluid then enters an opening 9 in the wall of the valve and passes through the hollow valve to a port 10, which when the valve is open registers with the outlet 4, as seen in Fig. 2. When the valve is closed, the fluid is shut off at the seat 5 and the ports 9 and 10 are shut off by the casing 1. It will therefore be evident that my improved valve is more than ordinarily secure against leakage.

On the upper side of the casing is a hollow projection or box 11, in which is pivoted at 12 an operating-lever 13. This lever has an arm 14, which extends downward into a cavity 15 in the forward end of the valve, said cavity being separated by a partition from the interior of the valve. By drawing the upper end of the lever forward the valve is opened, as shown in Fig. 2. Whenever the valve is released it closes automatically by reason of the pressure of fluid back of it.

To prevent the valve from closing too suddenly and making a disagreeable noise, besides straining the device, I provide an air-cushion, against which it closes. This air-cushion is provided in the forward end of the valve-casing, which is in the form of a cylinder 16, having a closed end 17. On the forward end of the valve is a solid piston 18, which fits the cylinder 16 closely. The parts are so proportioned that the valve can almost close before the air-cushion comes into action, which insures the rapid closing of the valve. During the latter part of the movement of the valve the piston enters the closed cylinder and the valve is brought gradually and noiselessly to a stop. Each time the valve is opened the interior of cylinder 16 is placed in communication with the atmosphere through the box 11, and hence the cylinder is always provided with the same amount of air when the valve closes. The operation of the valve will be fully understood without further explanation. It will be noticed that the box in which the operating-lever works is cut off at all times from the fluid-supply, and hence said lever requires no packing. The slot or opening 15 is made in a solid head, and the lever and its connection to the valve are very simple, strong, and durable.

The general form of the valve shown in Figs. 5 to 8 is the same as that shown in Figs. 1 to 4, inclusive. The valve-stem, however, is not a hollow cylinder, and it does not serve as an additional means of stopping the flow of liquid. In Figs. 5 to 8 the valve-stem 20 is in two parts, having on one end the head 21, which works in the chamber 22, and on the other end a piston 23, which works in an air-cylinder 24. The air-cylinder has an outlet 25 on its lower side, which serves to equalize the pressure of air each time the valve is opened. As the valve closes the piston cuts off the communication through the opening 25 and always cushions on the same amount of air in the end of the cylinder. The valve is operated by a lever 26 on the shaft 27, which shaft passes through a stuffing-box 28 and has on its outer end an operating-handle 29. The upper end of the box 30, which carries the valve-lever, is closed by a screw-cap 31, which permits of access to the screw or fastening 32, which connects lever 26 to the shaft. The operation of this form of the invention will be obvious from an inspection of the foregoing description and the drawings.

Having described my invention, what I claim, and desire to secure by Letters Patent, is—

1. In a self-closing valve, the combination with the cylindrical casing having the inlet-chamber at one end, the air-cylinder at the opposite end, and the lateral discharge-opening, of the valve arranged to control communication between said inlet-chamber and said lateral opening when the valve is open, said valve having a piston arranged to cushion in said air-cylinder as the valve closes.

2. In a self-closing valve, the combination with the cylindrical casing having the enlarged chamber at one end, the air-cylinder at the opposite end, and the lateral discharge-opening, of a hollow cylindrical valve having a head adapted to seat at the inner end of said enlarged chamber, a side opening communicating with said chamber when the valve is open, a second side opening communicating with the lateral opening of the casing when the valve is open, and a piston arranged to enter and cushion in the air-cylinder when the valve closes.

3. In a self-closing valve, the combination with a cylindrical casing having suitable inlet and outlet ports, of an air-cylinder communicating with the casing at one end, a valve adapted to open and close the ports in the casing and having one end of its stem extending into the air-cylinder and adapted to prevent the entrance of liquid to said cylinder, and a lever fulcrumed on the casing and having one end entering a recess formed in the valve-stem.

4. In a self-closing valve, the combination of a cylindrical casing having an inlet-port at one end, an enlarged cylindrical chamber at the inlet end provided with a valve-seat at its inner end, a lateral outlet-port, and an open box extending laterally therefrom, of a hollow cylindrical valve arranged to reciprocate in said casing, a head on said valve arranged in said chamber and adapted to seat on the inner end thereof, said head being smaller in cross-section than the chamber, inlet and outlet ports to said valve, a piston on the end of said valve arranged to cushion in the air-cylinder, and an operating-lever in the box or extension of the casing, said operating-lever being arranged to engage and reciprocate the valve.

In testimony whereof I affix my signature in presence of two witnesses.

GEORGE A. BLAKE.

Witnesses:
FRED F. FRANCIS,
BENJAMIN F. YOUNG.